United States Patent [19]

Hsu

[11] 4,164,363
[45] Aug. 14, 1979

[54] SINGLE MODE FIBER-TO-CHANNEL WAVEGUIDE THROUGH-LINE COUPLER

[75] Inventor: Hui-pin Hsu, Alexandria, Va.

[73] Assignee: The United States of America as represented by the Secretary of the Navy, Washington, D.C.

[21] Appl. No.: 870,774

[22] Filed: Jan. 19, 1978

[51] Int. Cl.² .............................................. G02B 5/14
[52] U.S. Cl. ................................................ 350/96.17
[58] Field of Search ............... 350/96.17, 96.15, 96.20, 350/96.21

[56] References Cited

U.S. PATENT DOCUMENTS

| | | | |
|---|---|---|---|
| 3,864,019 | 2/1975 | Smolinsky | 350/96.17 |
| 3,948,582 | 4/1976 | Martin | 350/96.21 |

OTHER PUBLICATIONS

L. G. Cohen, "Power Coupling from GaAs Injection Laser into Optical Fibers", BSTJ, vol. 51, No. 3, Mar. 1972, pp. 573–594.

Hsu, H. P., Milton A. F. "Flip-chip Approach to End-fire Coupling Between Single-Mode . . . ", Electronics Letters, vol. 12, No. 16, Aug. 1976, pp. 404–405.

J. Guttmann, O. Krampholz and E. Pfeiffer, "Optical Fiber–Stripline Coupler", Applied Optics, vol. 14, No. 5, May 1975, pp. 1225–1227.

Primary Examiner—Rolf G. Hille
Attorney, Agent, or Firm—R. S. Sciascia; Philip Schneider; Melvin L. Crane

[57] ABSTRACT

A single-mode optical fiber to a single-mode optical channel waveguide end-fire coupler. A single fiber held within a capillary tube and positioned by a micropositioner is adjusted for greatest light output and then secured by an epoxy to one end of a channel waveguide. The two elements are then secured in place in a slot in the capillary tube which prevents rotation of the waveguide relative to the single fiber.

7 Claims, 4 Drawing Figures

SINGLE MODE FIBER-TO-CHANNEL WAVEGUIDE THROUGH-LINE COUPLER

BACKGROUND OF THE INVENTION

This invention is directed to optical couplers and more particularly to a method of coupling a single-mode optical fiber to a single-mode, optical, channel waveguide end-fire coupler for optical communication systems.

Heretofore optical waveguides and bundles of optical fibers have been used for transmission of light and coupling means has been provided to couple light into and from each of the above. The present state of the art makes use of single mode optical fibers both solid and tubular types. These have been developed such that the propagation losses have been reduced to a few decibles per kilometer. Also, the performance of integrated optic devices like modulators/switches have been improved. These single mode fiber systems require practical and efficient low-loss single-mode fiber-to-integrated optics couplers to improve the loss characteristics. One of the main drawbacks in single mode optical fiber couplers is the difficulty caused by the smallness of the light guide dimensions. It is well known that efficient couplers require an extremely accurate alignment and a rugged assembly to maintain the accurate alignment. U.S. Pat. No. 3,948,582 sets forth an optical fiber connection for coupling an optical fiber to an optical fiber and is designed to be disconnected and reconnected again with reasonable accuracy. There is a need in the optical fiber communication art to connect single mode optical channel waveguide with accurate alignment for the least loss in the coupler.

SUMMARY OF THE INVENTION

The method couples a single-mode optical fiber to a single-mode optical channel waveguide for the greatest amount of light transmission with the least light loss at the coupling. Once the optical fiber has been secured to the channel waveguide, the joined elements are secured in place so that there is a rugged coupling. The joining of single-mode optical fibers to single-mode optical channel waveguide permits the integration of integrated optical devices and single-mode fibers to form fiber optic communication systems.

DETAILED DESCRIPTION

Figure 1:
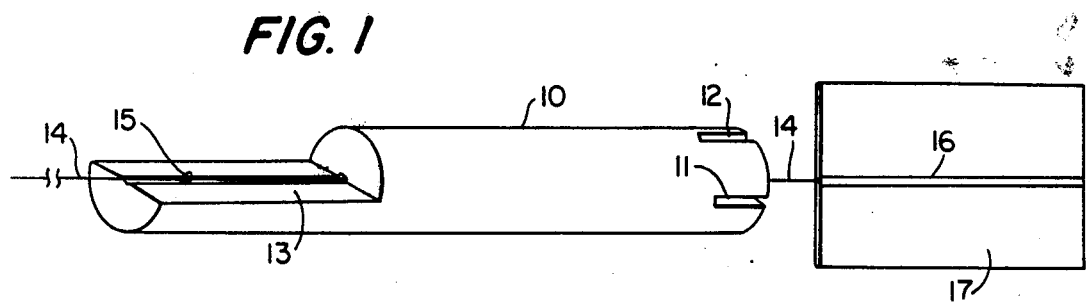
FIG. 1 illustrates a means by which a single-mode optical fiber is connected to a single-mode optical channel waveguide prior to alignment.
Figure 2:
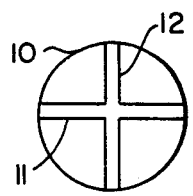
FIG. 2 illustrates one end view of the element shown in FIG. 1.
Figure 3:
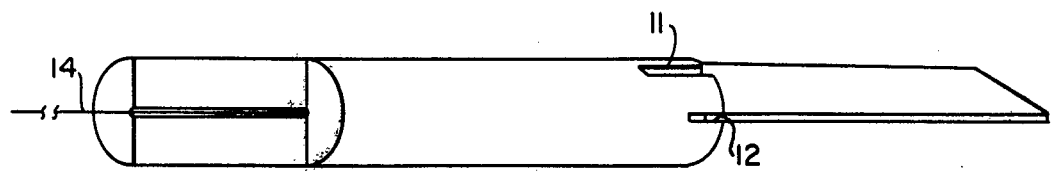
FIG. 3 illustrates the optical fiber and channel waveguide of FIG. 1 after alignment.

The coupling procedure is carried out in the following manner. A capillary tube 10 is formed with a slotted end with the slots 11 and 12 perpendicular to each other. Slot 11 is of greater length than slot 12, the purpose of which will be shown later. The opposite end of the capillary tube is cut along the length on the same plane as slot 11 to provide a length 13 which is of semicylindrical shape. One end of a piece of single-mode optical fiber 14, with both ends prepared by the score-and-breaking-under-tension method is inserted at the semicylindrical end of the capillary tube through the capillary tube and fixed in position at the semicylindrical end by use of a dissolvable wax 15. The fiber 14 extends beyond the slotted end of the capillary tube so that the protruding end may be placed in an abutting position relative to one end of a channel waveguide 16 on a substrate 17. The fiber-tube assembly is mounted on a micropositioner (not shown) such as a klinger differential screw translator which includes a XYZ translation stage with movement accuracy of less than 0.4 $\mu$m and two angular orientation adjustments.

The substrate 17 with the channel waveguide 15 on the surface thereof is prepared as by cleaving the ends or by carefully polishing the ends to form ends which are square and perpendicular to the channel waveguide axis. A prism coupler is positioned adjacent the channel waveguide for coupling light from the channel waveguide during assembly. The capillary tube with the single-mode optical fiber extending therethrough is arranged in a vertical position. The channel waveguide is positioned in vertical alignment with the optical fiber and in an abutting position with respect to the end of the optical fiber. A laser light is launched through an objective lens of a microscope into the end of the optical fiber on the semicylindrical end of the capillary tube. The light output of the optical fiber is subsequently fed into the abutting channel waveguide and the light that passes through the channel waveguide and exits through the prism coupler is detected and measured. The fiber-holding micropositioner is adjusted to maximize the prism coupler output from the channel waveguide. Once the fiber has been adjusted so that the measured light output is at its maximum, a diluted optical cement or epoxy is applied on the fiber channel waveguide butt joint and cured. Slight adjustment of the fiber position for maximum light output during the cement-curing period may be made to offset any effect the cement may have on the alignment during the curing period. Since the optical fiber channel waveguide coupling is formed in a vertical arrangement, waveguide setting will inhibit any external disturbances which would normally occur during horizontal alignment and setting of the cement during the curing period.

After the cement or epoxy has at the butt joint cured completely, the dissovable wax fixing the fiber to the semicylindrical end of the capillary tube is dissolved. The coupled single-mode optical fiber single-mode channel waveguide substrate assembly is then rotated together such that the substrate is aligned with the shortest slot (12) in the end of the capillary tube and pushed or slid into the slot. A low-index quick-curing cement of a desired type such as Loctite UV cured cement is then applied in the slot 11 to secure the fiber in place and at slot 12 in the capillary tube to secure the channel waveguide-substrate to the slotted end of the capillary tube. The quick curing cement is also applied onto the fiber along the semicylindrical end of the capillary tube in order to secure the channel waveguide-substrate to the slotted end of the capillary tube. The quick curing cement is also applied onto the fiber along the semicylindrical end of the capillary tube in order to secure the optical fiber to that end of the capillary tube.

Figure 4:
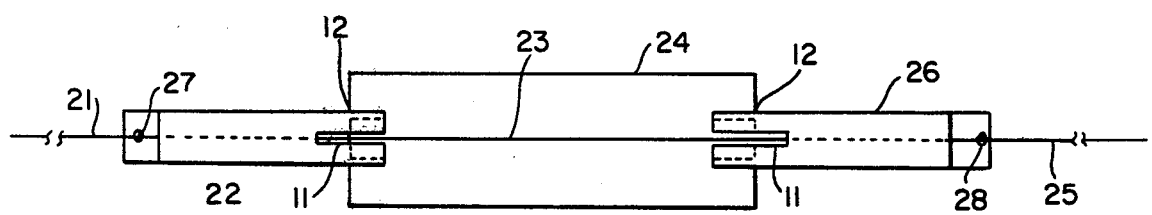
FIG. 4 illustrates a single-mode optical fiber secured to each end of a single-mode optical channel waveguide.

In order to form an optical fiber channel waveguide optical fiber through-line such as shown by FIG. 4, a capillary tube optical fiber assembly is secured to each end of a channel waveguide in accordance with the procedure set forth above. As shown in the drawing, a single-mode optical fiber 21 extending through capillary tube 22 is secured to one end of a channel waveguide 23-substrate 24, then a second single-mode optical fiber 25 and capillary tube 26 are secured to the opposite end of the channel waveguide substrate 24. The slotted ends of the capillary tubes 22 and 26 are cemented to their respective ends of the channel waveguide 23-substrate 24 and the single-mode optical fibers 21 and 25 are secured to the semicylindrical ends of their respective capillary tubes at 27 and 28.

By use of suitable channel waveguide optical fiber couplers such as are well known in the art, optical signals may be coupled from the channel waveguide and into the single-mode optical fiber or from the optical fiber into the channel waveguide and out through the coupler for optical communication over a single-mode optical fiber.

Since the optical fiber is butt-joined to the channel waveguide and then the butt joint combination is moved into the end of the capillary tube, the capillary tube protects the joint from external disturbances. Therefore, the joint is rugged and should have an efficient, long life.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A coupler for securely coupling an optical fiber to an optical channel waveguide laid down on a plate-like substrate comprising:
   a capillary tube, said optical fiber extending through the center and out both ends thereof, one end of the tube being slotted diametrically and the other end being cut diametrically so that it is semicircular in shape and exposes the fiber at that end,
   the plate-like substrate, after the end of the fiber is properly aligned with the end of the channel waveguide, being pushed into the slot to mate snugly and form a secure mechanical joint therewith.

2. A coupler as in claim 1, wherein:
the slotted end of said tube has a second diametral slot therein, said second slot being longer than the first in the axial direction of the tube and being oriented so that its plane is normal to the plane of the first slot.

3. A coupler as in claim 1, wherein the flat part of the semicircle is in the same plane as said second slot at the other end of said tube.

4. A method of coupling a single-mode optical fiber to a single-mode optical channel waveguide on a flat-plate substrate comprising the steps of:
   squaring the ends of said optical fiber and said channel waveguide;
   passing one end of said optical fiber through a slotted-end capillary, with the end of said optical fiber passing through said capillary aligned with said channel waveguide in abutting relationship;
   directing optical radiation through said optical fiber into said channel waveguide so that the radiation propagates through said channel waveguide;
   measuring the output of said radiation propagating through said channel waveguide;
   adjusting said optical fiber relative to said channel waveguide to a position at which maximum radiation is propagated through said channel waveguide;
   cementing said optical fiber to said channel waveguide at the position at which maximum radiation is coupled from said channel waveguide;
   rotating said channel waveguide and said optical fiber to align said plate substrate with a slot in the slotted end of said capillary;
   fitting said substrate into the slot in said capillary; and
   cementing said substrate and waveguide to said capillary within said slot.

5. A method as claimed in claim 4 which comprises:
   slotting the end of said capillary to form a pair of slots, each lying on a diameter perpendicular to the other, with the slot on one diameter of greater length than the slot on the other diameter.

6. A method as claimed in claim 5 in which:
said channel waveguide is forced into the slot of least length and
the cement is placed in the slots to cement the channel waveguide and optical fiber in place.

7. A method as claimed in claim 4 which comprises:
   mounting said capillary-optical fiber on a micropositioner for accurately aligning said optical fiber with said channel waveguide for maximum light output.

* * * * *